(12) United States Patent
Follis

(10) Patent No.: US 9,544,149 B2
(45) Date of Patent: Jan. 10, 2017

(54) AUTOMATIC E-SIGNATURES IN RESPONSE TO CONDITIONS AND/OR EVENTS

(71) Applicant: Adobe Systems Incorporated, San Jose, CA (US)

(72) Inventor: Benjamin D. Follis, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 49 days.

(21) Appl. No.: 14/107,967

(22) Filed: Dec. 16, 2013

(65) Prior Publication Data

US 2015/0172058 A1 Jun. 18, 2015

(51) Int. Cl.
*H04L 9/32* (2006.01)
*G06F 21/64* (2013.01)

(52) U.S. Cl.
CPC ............ *H04L 9/3247* (2013.01); *G06F 21/64* (2013.01); *G06F 2221/2101* (2013.01); *H04L 2209/68* (2013.01)

(58) Field of Classification Search
CPC .... H04L 9/3247; H04L 2209/68; G06F 21/64; G06F 2221/2101
USPC ........................................................ 713/176
See application file for complete search history.

(56) References Cited

U.S. PATENT DOCUMENTS

| | | | |
|---|---|---|---|
| 5,825,880 A | 10/1998 | Sudia et al. | |
| 5,910,987 A * | 6/1999 | Ginter ............... | G06F 21/00 348/E5.006 |
| 6,073,101 A | 6/2000 | Maes | |
| 6,091,835 A | 7/2000 | Smithies et al. | |
| 6,157,935 A | 12/2000 | Tran et al. | |
| 6,240,091 B1 * | 5/2001 | Ginzboorg ............. | H04L 12/14 370/270 |
| 6,615,234 B1 * | 9/2003 | Adamske ............... | H04L 29/06 709/200 |
| 6,691,089 B1 | 2/2004 | Su et al. | |

(Continued)

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

(Continued)

*Primary Examiner* — Matthew Henning
(74) *Attorney, Agent, or Firm* — Finch & Maloney PLLC

(57) ABSTRACT

Techniques are disclosed that allow for automatic signing of a digital document in response to some event and/or when the document satisfies some predefined condition. The document may be, for example, an agreement, a technical paper for publication, a press release or marketing materials, or any other digital document that might need to be assented to, approved by, and/or attributed to one or more persons or representatives. The techniques may further provide support for automatic signature tracking and notification in order to assist with auditability. In one example embodiment, the techniques are implemented in the context of an e-signature application or service, which may be installed locally on the user's computer or provided to the user via a network from a server. In one example embodiment, the e-signature service is configured to automatically impress a signer's signature into a given document, if the signer's pre-established auto-sign criteria is met.

20 Claims, 8 Drawing Sheets

(56) References Cited

U.S. PATENT DOCUMENTS

| | | | |
|---|---|---|---|
| 6,928,421 | B2 | 8/2005 | Craig et al. |
| 6,959,382 | B1* | 10/2005 | Kinnis .................. G06F 21/602 713/168 |
| 7,581,109 | B2 | 8/2009 | De Boursetty et al. |
| 7,694,143 | B2 | 4/2010 | Karimisetty et al. |
| 7,779,355 | B1 | 8/2010 | Erol et al. |
| 7,895,166 | B2 | 2/2011 | Foygel et al. |
| 7,996,367 | B2 | 8/2011 | Foygel et al. |
| 7,996,439 | B2 | 8/2011 | Foygel et al. |
| 8,126,868 | B1 | 2/2012 | Vincent |
| 8,234,494 | B1 | 7/2012 | Bansal et al. |
| 8,844,055 | B2 | 9/2014 | Follis et al. |
| 8,918,311 | B1 | 12/2014 | Johnson et al. |
| 8,930,308 | B1 | 1/2015 | Johnson et al. |
| 9,058,515 | B1 | 6/2015 | Amtrup et al. |
| 2002/0038290 | A1 | 3/2002 | Cochran et al. |
| 2002/0095290 | A1 | 7/2002 | Kahn et al. |
| 2002/0103656 | A1 | 8/2002 | Bahler et al. |
| 2003/0009513 | A1 | 1/2003 | Ludwig et al. |
| 2003/0037004 | A1 | 2/2003 | Buffum et al. |
| 2003/0074216 | A1 | 4/2003 | Salle |
| 2003/0083906 | A1* | 5/2003 | Howell .................. G06Q 40/02 705/4 |
| 2003/0154083 | A1 | 8/2003 | Kobylevsky et al. |
| 2003/0187671 | A1* | 10/2003 | Kumhyr .................. G06Q 10/06 705/7.27 |
| 2003/0217275 | A1* | 11/2003 | Bentley .................. G06F 21/10 713/184 |
| 2004/0102959 | A1 | 5/2004 | Estrin |
| 2004/0139344 | A1 | 7/2004 | Maurer |
| 2004/0167847 | A1 | 8/2004 | Nathan |
| 2004/0204939 | A1 | 10/2004 | Liu et al. |
| 2004/0225887 | A1 | 11/2004 | O'Neil et al. |
| 2004/0243811 | A1 | 12/2004 | Frisch et al. |
| 2004/0264652 | A1 | 12/2004 | Erhart et al. |
| 2005/0228999 | A1* | 10/2005 | Jerdonek ............ H04L 63/0823 713/176 |
| 2005/0289345 | A1 | 12/2005 | Haas et al. |
| 2006/0020460 | A1 | 1/2006 | Itou |
| 2006/0041828 | A1 | 2/2006 | King et al. |
| 2006/0110011 | A1 | 5/2006 | Cohen et al. |
| 2006/0143462 | A1 | 6/2006 | Jacobs |
| 2006/0157559 | A1 | 7/2006 | Levy et al. |
| 2006/0212813 | A1 | 9/2006 | Yalovsky et al. |
| 2006/0253324 | A1 | 11/2006 | Miller |
| 2007/0055517 | A1 | 3/2007 | Spector |
| 2007/0113164 | A1 | 5/2007 | Hansen et al. |
| 2007/0124507 | A1 | 5/2007 | Gurram et al. |
| 2007/0143398 | A1 | 6/2007 | Graham |
| 2007/0220614 | A1 | 9/2007 | Ellis et al. |
| 2007/0226511 | A1 | 9/2007 | Wei et al. |
| 2008/0015883 | A1 | 1/2008 | Hermann |
| 2008/0177550 | A1 | 7/2008 | Mumm et al. |
| 2008/0180213 | A1 | 7/2008 | Flax |
| 2008/0195389 | A1 | 8/2008 | Zhang et al. |
| 2009/0062944 | A1 | 3/2009 | Wood et al. |
| 2009/0112767 | A1 | 4/2009 | Hammad et al. |
| 2009/0116703 | A1 | 5/2009 | Schultz |
| 2009/0117879 | A1 | 5/2009 | Pawar et al. |
| 2009/0177300 | A1 | 7/2009 | Lee |
| 2009/0222269 | A1 | 9/2009 | Mori |
| 2009/0228584 | A1 | 9/2009 | Maes et al. |
| 2009/0254345 | A1 | 10/2009 | Fleizach et al. |
| 2009/0260060 | A1 | 10/2009 | Smith et al. |
| 2009/0307744 | A1 | 12/2009 | Nanda et al. |
| 2009/0327735 | A1* | 12/2009 | Feng .................. H04L 9/0891 713/180 |
| 2010/0131533 | A1 | 5/2010 | Ortiz |
| 2010/0161993 | A1 | 6/2010 | Mayer |
| 2010/0281254 | A1 | 11/2010 | Carro |
| 2010/0306670 | A1 | 12/2010 | Quinn et al. |
| 2011/0022940 | A1 | 1/2011 | King et al. |
| 2011/0047385 | A1 | 2/2011 | Kleinberg |
| 2011/0212717 | A1 | 9/2011 | Rhoads et al. |
| 2011/0225485 | A1 | 9/2011 | Schnitt |
| 2012/0072837 | A1 | 3/2012 | Triola |
| 2012/0254332 | A1 | 10/2012 | Irvin |
| 2013/0046645 | A1 | 2/2013 | Grigg et al. |
| 2013/0089300 | A1 | 4/2013 | Soundararajan et al. |
| 2013/0103723 | A1 | 4/2013 | Hori |
| 2013/0132091 | A1 | 5/2013 | Skerpac |
| 2013/0166915 | A1 | 6/2013 | Desai et al. |
| 2013/0179171 | A1 | 7/2013 | Howes |
| 2013/0182002 | A1 | 7/2013 | Macciola et al. |
| 2013/0191287 | A1 | 7/2013 | Gainer et al. |
| 2013/0269013 | A1 | 10/2013 | Parry et al. |
| 2013/0283189 | A1 | 10/2013 | Basso et al. |
| 2013/0339358 | A1 | 12/2013 | Huibers et al. |
| 2014/0019761 | A1 | 1/2014 | Shapiro |
| 2014/0078544 | A1 | 3/2014 | Motoyama et al. |
| 2014/0079297 | A1 | 3/2014 | Tadayon et al. |
| 2014/0236978 | A1 | 8/2014 | King et al. |
| 2014/0282243 | A1 | 9/2014 | Eye et al. |
| 2014/0294302 | A1 | 10/2014 | King et al. |
| 2014/0343943 | A1 | 11/2014 | Al-Telmissani |
| 2014/0365281 | A1 | 12/2014 | Onischuk |
| 2014/0372115 | A1 | 12/2014 | LeBeau et al. |
| 2015/0012417 | A1 | 1/2015 | Joao et al. |
| 2015/0016661 | A1 | 1/2015 | Lord |
| 2015/0063714 | A1 | 3/2015 | King et al. |
| 2015/0073823 | A1 | 3/2015 | Ladd et al. |
| 2015/0100578 | A1 | 4/2015 | Rosen et al. |
| 2015/0127348 | A1 | 5/2015 | Follis |
| 2016/0078869 | A1 | 3/2016 | Syrdal et al. |

OTHER PUBLICATIONS

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.

Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.

Notice of Allowance received in U.S. Appl. No. 14/625,852 (sent Jul. 25, 2016).

Notice of Allowance received in U.S. Appl. No. 14/551,560 (sent Nov. 4, 2016) (19 pages).

\* cited by examiner

AUTOMATIC E-SIGNATURES IN RESPONSE TO CONDITIONS AND/OR EVENTS

FIELD OF THE DISCLOSURE

This disclosure relates to electronic signatures, and more particularly, to the provisioning of automatic e-signatures in response to conditions or events.

BACKGROUND

An electronic signature, or so-called e-signature, generally refers to an electronically born manifestation of a person's signature or mark that indicates that the person has assented to the contents of a digital document or in some cases that the person has prepared the digital document. An e-signature can be represented as stylized script that appears to have been written by hand, and when a digital document that has been executed using an e-signature is printed or displayed, the stylized script of the e-signature appears in the appropriate location in that document. Such e-signatures are generally accepted as a legal signature in the same fashion as an ink-based hand-written signature. To this end, there are a number of commercially available e-signature services, such as EchoSign by Adobe Systems Incorporated and DocuSign by DocuSign, Inc.

DETAILED DESCRIPTION

Figure 1A:
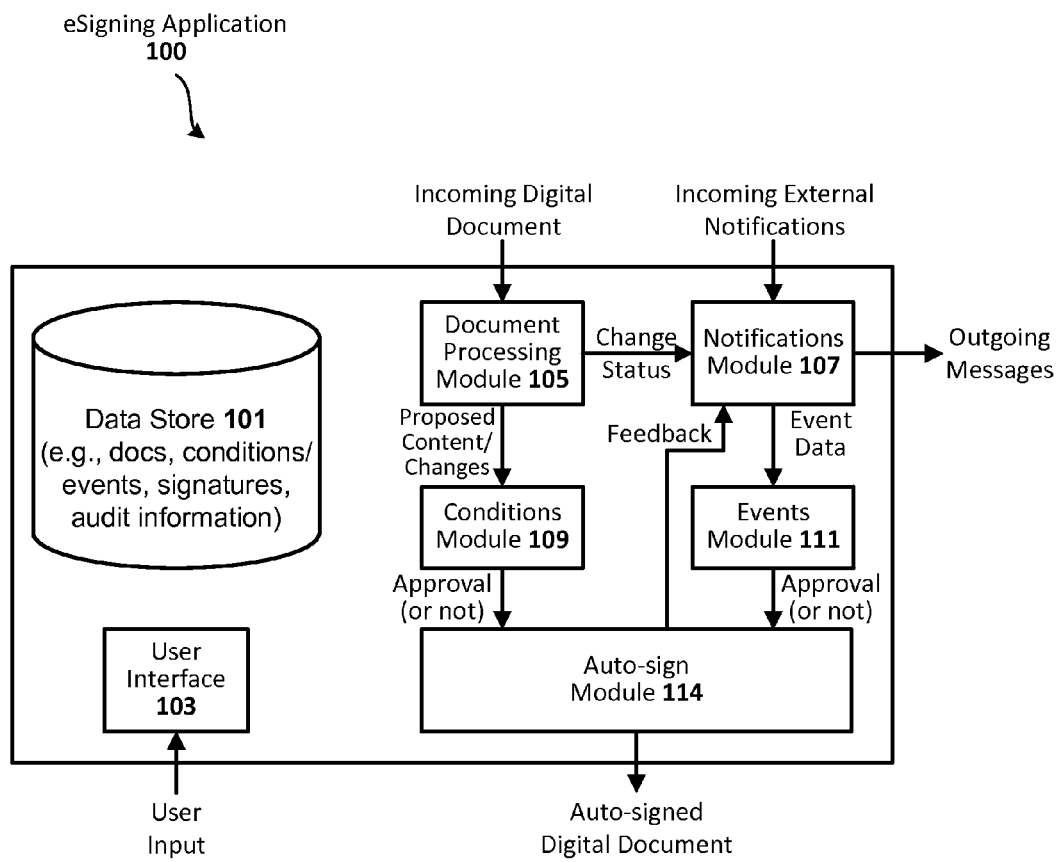
FIG. 1a illustrates a block diagram of an eSigning application configured in accordance with an embodiment of the present invention.

Techniques are disclosed that allow organizations and individuals to automatically sign a digital document in response to some event and/or when the document satisfies some set of predefined conditions. The digital document may be, for example, an agreement to be executed by one or more parties, a technical paper for publication to be executed by a number of co-authors, a press release or marketing materials for public release to be executed by a number of executives, or any other digital document that might need to be assented to, approved by, and/or attributed to one or more persons or representatives. The techniques may further provide support for automatic signature tracking and notification in order to assist with auditability. In one example embodiment, the techniques are implemented in the context of an e-signature application or service, which may be installed locally on the user's computer or provided to the user via a network from a remote server. In one example embodiment, when a signer receives via an e-signature service a proposed document for execution, the service is configured to automatically impress that signer's signature into the document, if the signer's pre-established auto-sign criteria is met. In some embodiments, the service may automatically notify the signer that an automatic signature has occurred, and further provide automatic signature auditing information in the notification sufficient for reasonable auditing requirements associated with a that auto-signature. In addition, the service may be programmed or otherwise configured to separately track automatic signatures and provide reporting tools allowing automatic signature specific queries.

The following definitions may be useful to assist in understanding this disclosure. A sender generally refers to the person sending a digital document for signature by a signer. A signer generally refers to a person who is signing the digital document sent by the sender, and who needs to mark the digital document signifying the signer's assent. The assent may represent, for example, the signer's agreement with all terms of the document, the signer's assertion of authorship, or the signer's approval of the document. A digital document generally refers to an electronically represented document that can be sent via an online electronic signature service from a sender to a signer. A digital document may include text, audio, video, photographs, and/or other digital objects that can be used to manifest the content of the given digital document. An electronic signature service (also referred to herein as an e-signature service) generally refers to an application or service that allows for the paperless approval of digital documents. The application/service, which may be installed locally on the user's computer or provided remotely to the user via a network such as the Internet and the user's local area network, may maintain information about senders, signers, digital document details (e.g., document name/title, names of parties/authors/approvers, negotiated terms or text, etc), signatures (e.g., dates provided and surrounding circumstances), and other pertinent information sufficient to legally enforce the document or otherwise facilitate legitimate approvals and/or attribution. Adobe EchoSign is one such application/service. An electronic signature or e-signature generally refers to a digital representation that an individual or representative of an organization has assented to, approved, and/or authored the content of a given digital document. An e-signature can be displayed, printed, or aurally presented much in the same way an actual ink signature can be, and can be treated or otherwise relied upon in a similar manner with respect to legality (e.g., signature can cause a legally binding contract), attribution (e.g., signature can denote authorship), approval (e.g., signature can denote review and approval), or other such signature reliant scenarios.

General Overview

Many routine business functions require signatures from members of an organization having signing authority. Such authorized signatories are often company officers or otherwise very high-up in the management structure and/or otherwise have substantial demands on their time. As such, they frequently they are unable to personally provide those signatures in a timely fashion. Organizations may deal with this in various ways. For example, an assistant of the authorized signer may possess a rubber stamp containing the requisite signature, or letterhead may exist which has the signer's signature fixed thereon. These methods suffer from a number of drawbacks, namely the assistant may sign something they shouldn't have, or the letterhead could be stolen or otherwise misused. Additionally, the letterhead may require specific document formatting, and hence impairs the ability to allow signatures to be placed in arbitrary locations.

Thus, and in accordance with an embodiment of the present invention, techniques are provided herein that allow organizations and individuals to automatically sign an agreement or other digital document in response to some event and/or when the agreement or document matches some set of predefined terms. The techniques may further provide support for automatic signature tracking and notification in order to assist with auditability. In one example embodiment, the techniques are implemented in the context of an e-signature service that allows parties to a given agreement to specify a set of conditions that, when satisfied, authorize the service to automatically sign the agreement or document on their behalf. For example, an authorized signer may specify that a contract with a specific title such as "Phone Service Agreement" and specific service costs such as "19.95/month" is a contract that the service is authorized to automatically sign. The title and cost constraints can readily be analyzed using, for instance, term search, natural language processing, or other content analysis techniques suitable to analyze a proposed version of a given contract. So, when the signer receives such an agreement via the service, the service can be configured to confirm any specified conditions and/or events were satisfied and then automatically impress that authorized signer's signature into the agreement. The auto-executed agreement can thereafter be treated as if it were manually signed by the signer. The signature so auto-impressed onto the document may be, for example, previously stored within or otherwise accessible to a system upon which the service operates, or a system generated signature based-on pre-entered data such as the signer's typed name. In such cases, a stylized script selected by the signer or arbitrarily selected can be used to manifest the signer's signature.

Any party to the given agreement or document can access the service via a user interface to establish the requisite criteria for an auto-sign action to be executed. In some example embodiments, the user interface to the service can be provided via a remote server to a computer of a given party. In such cases, the parties can access the server from their respective so-called client computers via any suitable communication network (e.g., such as a local area network and the Internet, or a private network). In other example embodiments, the user interface to the service can be provided via an application installed and executing on a given party's computer. In any such embodiments, the party's computer can be, for instance, a desktop, laptop, tablet, smart phone or any other suitable computing system. Note that a "party" as used herein can be, for example, a party to an agreement (e.g., sales agreement, license, lease, etc)), an author of the document, or a person who is tasked with approving a proposal or other contents within the document.

In one example scenario, assume that an agreement naming two parties is provided, such as a non-disclosure agreement (or so-called NDA). Further assume that the NDA has the following five negotiable terms: one-way or bi-directional protection, term of confidentiality period, term of non-use period for confidential information, yes or no with respect to a marking requirement for information to be considered confidential under the NDA, and the choice of law should the NDA need to be legally interpreted for whatever reason. Further assume the remainder of the NDA has been previously agreed to by the parties, such as boilerplate and/or any other non-contentious or otherwise mutually agreeable provisions (e.g., arbitration clause, assignment clause, etc).

Each party to the NDA can specify their respective requirements for each of the five negotiable terms in order for the service to auto-sign the agreement on behalf of that party. So, a first party under the NDA may want the following terms: one-way NDA; 10+ year confidentiality period, 10+ year non-use period, no marking requirement, and California for the choice of law (where that party is head-quartered). These preferred terms can be provided to the user interface, for example, via typing into a given field, selection from pull-down menus, or simply typing into a list or open form to which the service has access. Thus, once a proposal of the NDA is received by the service from the second party, the eSigning service configured for providing auto-signatures can then analyze the proposed NDA, and with particular focus on the five negotiable terms of interest.

If the NDA form is implemented with structured data (e.g., fillable fields or pull-down menus), then this analysis may entail accessing each piece of structured data from its known location on the form and comparing that proposed data to the requirements provided by the signing party. This comparison can be readily accomplished using any number of known comparison techniques, such as digital comparator where the bits making up the field data are compared to the bits making up the user-provided criteria, or a hash compare, or any other suitable comparison. If the NDA form is implemented with unstructured data (e.g., one continuous text document or a digital image of the document), then this analysis may initially include conversion to text (if document is image based), term search and identification using any known techniques such as optical character recognition (OCR) for imaged forms and text extraction and analysis algorithms. Once the proposed terms are identified and extracted, they can be compared to the requirements provided by the signing party, in a similar fashion to a structured data NDA form.

In another embodiment, instead of a set of conditions (such as specific agreement terms or other pre-established conditions), the signer may specify an event or set of events such that when the service detects or otherwise receives notification of those events occurring (either in whole or part) the service is authorized to automatically sign the agreement or document. These events may, for instance, originate entirely within the context of the service (generally referred to herein as internal events), or may be those events that the service has been notified have occurred (generally referred to herein as external events), or a combination of such internal and external events. For example, the signer may specify or otherwise indicate that the service should automatically sign the proposed document if at least three other people have already signed (event internal to service), or if the signer's organization notifies the service that the "underwriters" or "analysis team" or "law department" has provided approval (event external to service).

In some embodiments, the service may automatically notify the signer (e.g., via the signer's mobile and/or desktop computer systems) that an automatic signature has occurred, and further provide automatic signature auditing information in the notification sufficient for reasonable auditing requirements. For instance, the service may have access to audit data and/or institute a callback to the signer's computer system to harvest any typical agreement metadata (e.g., name of agreement, parties, revision of agreement, etc), as well as other information of interest such as the auto-sign conditions and/or events the signer provided and the reasons why the contract matched the given conditions, or the event that triggered the auto-signature. Thus, auditing data is available should it be necessary.

In addition, the service may be configured to separately track automatic signatures and provide reporting tools allowing automatic signature specific queries. For example, the service may allow searching specifically for situations where an automatic signature was provided, and further provide specific reports tailored to that automatic signature situation, such as the conditions and/or events that caused the auto-signature process to be executed, the date and time of the auto-signature, and any subsequent signing activity by the other party or parties and the date and time of those auto-signatures. Numerous reporting metrics and schemes will be apparent in light of this disclosure.

System Architecture

FIG. 1a illustrates a block diagram of an eSigning application 100 configured in accordance with an embodiment of the present invention. The application is programmed or otherwise configured to carry out an auto-signing process in response to signer specified conditions or events (or a combination thereof) being satisfied. The application may further include other functionality, such as that functionality typical of an eSigning application (like Adobe EchoSign e-signature service or any other commercially available eSigning service) and as will be appreciated in light of this disclosure. As can be seen, the application includes a data store 101, a user interface 103, a document processing module 105, a notifications module 107, a conditions module 109, an events module 111, and an auto-sign module 114. Each of these components, which will be discussed in turn, can be implemented in software, such as a set of instructions (e.g., C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various auto-signature methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the auto-signature functionality described herein. In a more general sense, any suitable combination of hardware, software, and firmware can be used. So, for instance, the application may be embodied in a non-transient computer program product that is executable by one or more processors, or in a system having physical componentry programmed or otherwise configured to perform conditional auto-signing as variously described herein. As will be further appreciated, note that while a specific arrangement of modules is shown, other embodiments may include a different degree of integration. For instance, the functionality of some modules may be integrated into other modules. For example, the functionality of the notifications module 107 can be integrated into the events module 111 in some embodiments. Likewise, the functionality of the conditions module 109 and the events module 111 can be integrated into a single module. In still other embodiments, all of the depicted modules can be integrated into a single one of the modules, such as the user interface 103. Numerous such variations and configurations will be apparent.

In operation, the user can provide input to, among other things, specify conditions and/or events that dictate when that user's signature can be automatically applied to a given digital document. So, when an incoming digital document is received by the application, it is analyzed to determine if any specified condition has been met. Likewise, any relevant incoming external notifications and/or internal notifications can be analyzed to determine if any specified event has occurred. All relevant information can be stored in data store 101 and is generally accessible to the auto-signature process (e.g., each of the user interface 103 document processing module 105 notifications module 107 conditions module 109 events module 111 and auto-sign module 114 can store data to or access data from the data store 101 as needed). If all conditions are met and/or all events have occurred, then the received document can be auto-signed. The interested parties can be notified of the successful outcome by an outgoing message. Similarly, if one or more conditions and/or events are missing, then the received document will not be auto-signed, and the interested parties can be notified of the current status by an outgoing message.

The user interface module 103 may be generally configured to allow the user to interact with the eSigning application 100. In one example embodiment, the user interface module 103 is configured to provide a user interface that allows the user to configure the eSigning application 100 with respect to conditions and events for qualifying when a given document can be auto-signed. To this end, FIGS. 5a-d illustrate example screen shots showing features of one such user interface that can be provisioned by the user interface module 103 in accordance with an embodiment. Other modules depicted in FIG. 1a may play a role in preparing data for presentation to the user via the user interface module 103 as will be appreciated and explained in turn.

Figure 5A:
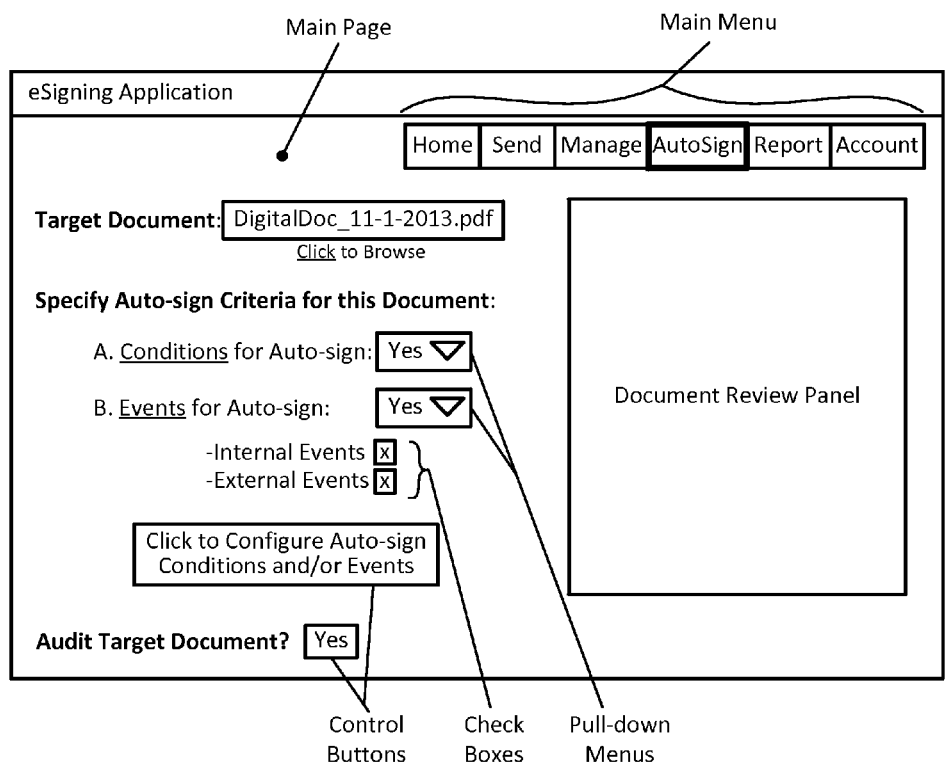
FIGS. 5a-d collectively illustrate a user interface for an eSigning application configured for auto-signing a digital document in response to one or more conditions being satisfied and/or one or more events occurring, in accordance with an embodiment of the present invention.

As can be seen, FIG. 5a shows an example user interface for the eSigning application 100 which generally includes a main menu having six menu options: Home, Send, Manage, AutoSign, Report, and Account. Each of the Home, Send, Manage, Report, and Account menu options along with the underlying functionalities can be implemented, for example, as done with the Adobe EchoSign system. Numerous such menus and the underlying functionalities will be apparent in light of this disclosure, and the claimed invention is not intended to be limited to any such particular configurations. In addition to these optional menu items, the main menu includes an AutoSign menu item that allows the user to access a main page of the auto-sign function of the application.

As will be appreciated, while the auto-sign function is depicted in FIG. 5a as being included in the context of an overall eSigning application 100, it could also be provided as a stand-alone application that could be used, for example, in conjunction with one or more separate eSigning applications. Also, while the AutoSign menu option is shown as a separate menu option in the main menu in this example embodiment, it could also be integrated into one of the existing menu options as a sub-menu option, or provided as a separate control button that is set apart from the main menu. Thus, note that the degree of integration and optional functions associated with auto-sign function can vary from one embodiment to the next.

With further reference to the example embodiment shown in FIG. 5a, the user has selected the AutoSign menu item (as generally depicted by bolding around the item) with an appropriately placed mouse-click or finger tap or other suitable user input, thereby causing the user interface 103 to present the main page of the auto-sign function of the eSigning application 100 is presented to the user. As can be further seen, the main page includes four main sections: an area for selecting a target document, an area that allows the user to specify auto-sign criteria for the target document, an area that allows the user to access audit data associated with the target document, and a document review panel. Numerous other user interface (UI) layouts will be apparent.

The area for selecting a target document includes a 'click to browse' UI control feature that allows the user to browse one or more storage locations accessible to the user's computing device, whether it be a local memory included within that device, or a remote memory accessible to the device via a network, or some combination of such memories. In some embodiments, once the user makes a document selection, the document processing module 105 may be engaged to analyze and extract or otherwise present content of that selected document to the user via the document preview panel, as will be discussed in turn.

Figure 5B:
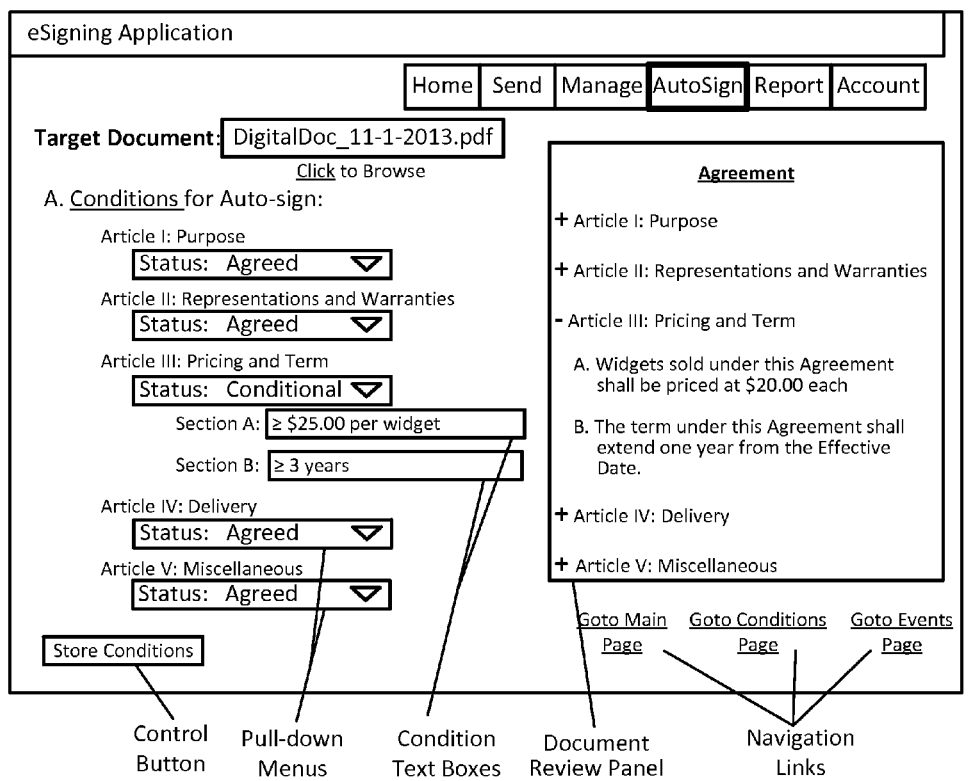
Figure 5C:
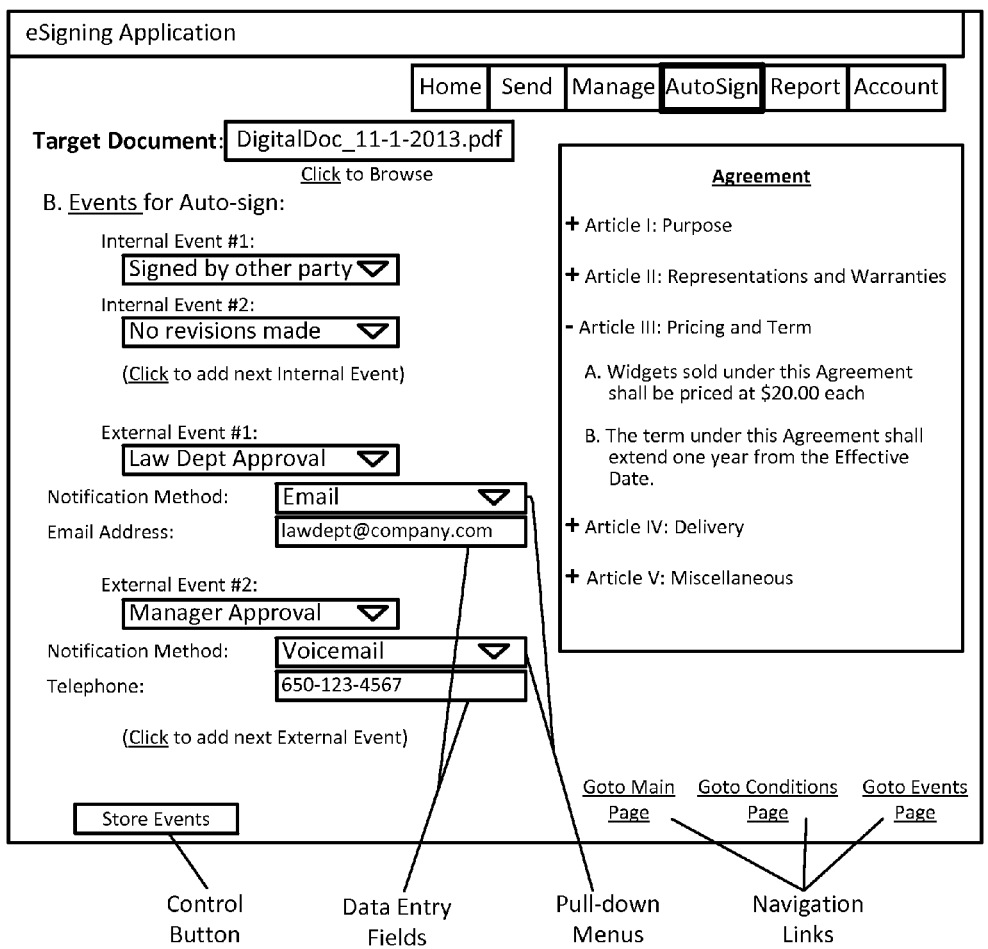

The area that allows the user to specify auto-sign criteria for the target document includes two sub-sections: section A for indicating that the user wishes to specify conditions for auto-sign, and section B for indicating that the user wishes to specify events for auto-sign, which may include internal and/or external events. As can be seen, the area is configured with pull-down menus that allow the user to select 'Yes' or 'No' for each of sections A and B, and check boxes for indicating whether the events of interest are internal or external to the target document. The user interface 103 may be configured to provide other suitable UI control features can be used as well, as will be appreciated. In this example scenario, the user has indicated that they wish to specify both conditions and events for auto-sign, including both internal and external events, by selecting yes in both pull-down menus and selecting both check boxes. As will be appreciated, other scenarios may include only conditions or only events. Likewise, if events are specified, they may be only external events or only internal events. A UI control button is provided for the user to click or tap or otherwise select once the choices are made. FIGS. 5b-c show example screen shots for the user interface further provided via user interface 103 when configuring the conditions and events, respectively, and will be discussed in turn.

Figure 5D:
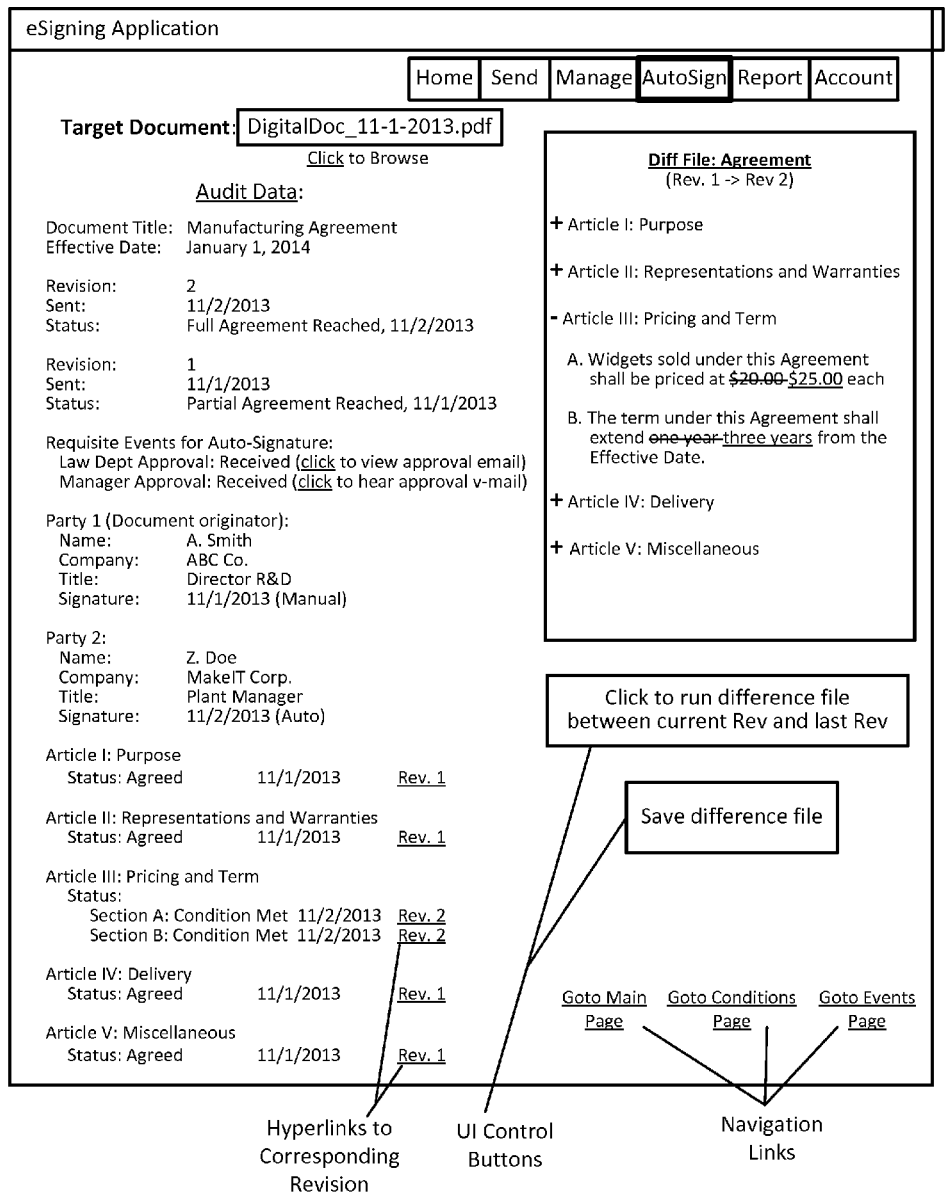

The area that allows the user to access audit data associated with the target document is configured with a control button that the user can select, which in turn will cause the user interface 103 to present audit data to be presented to the user. FIG. 5d shows an example screen shot of an audit page provided via user interface 103 when presenting audit data in response to the user requesting same (via an appropriately placed click or other selection on the 'Yes' UI control button), and will be discussed in turn. The document review panel allows the target document to be presented to the user at various times, such as for configuration of conditions and/or events, for auditing, for the initial review of the document or when establishing baseline approvals and disapprovals for the various document portions, or for review of intermediate or final drafts.

The document processing module 105 is programmed or otherwise configured to receive the incoming digital document and to process that document as needed so that information contained therein can be provided to the conditions module 109 and the notifications module 107 as needed. As previously explained, the document processing module 105 may also provide the extracted information to the user interface 103 so that the information can be presented to the user. The incoming digital document may be received, for example, by virtue of a user selecting that document via the user interface 103 as previously discussed with reference to FIG. 5a. In other cases, the document may be received from another party sending the document to the user (via an eSigning service). To this end, the document processing module may be configured to operate on original documents selected locally or remotely, or on documents that have been revised.

In one example embodiment, the document processing module 105 operates to establish a baseline of information within the document (based on first analysis of document), and to identify information within the document that has changed since the last version of the document was received. The specific document processing carried out by the document processing module 105 depends on the nature of the document, as will be appreciated in light of this disclosure. Any number of suitable known content extraction techniques can be used to expose the data within the document. For instance, if the document is implemented with a form having structured data (e.g., fillable fields or user-selectable pull-down menus), then processing by the document processing module 105 may entail extracting or otherwise accessing each piece of structured information from its known location on the document form, and either establishing a baseline based on that extracted information or determining if that information has changed from the previous version of the document. Alternatively, if the document is implemented with unstructured data (e.g., one continuous text document or a digital image of the document), then processing by the document processing module 105 may initially include conversion to text using OCR or other suitable conversion technique (if document is image based) followed by text extraction (e.g., on a sentence-by-sentence basis, paragraph-by-paragraph basis, or section-by-section basis, or some other acceptable document portion basis). Once the unstructured information has been accessed, the document processing module 105 can then establish a baseline based on that extracted information, or determine if that information has changed from the previous version of the document. Some documents may have a combination of structured and unstructured information, and the document processing module can operate on both types of data accordingly.

The information extracted from the document can be, for example, presented to the user via a document preview panel (such as the one shown in FIGS. 5a-d) to allow the user to establish initial approvals or disapprovals on a sentence-by-sentence or a section-by-section basis or other such suitable extracted document portion, or assessed for changes from the previous version by running a hash compare or other suitable difference detection technique on each extracted portion. Extracted information may be stored by the document processing module 105 in data store 101, or cached locally in the document processing module 105 for purposes of facilitating subsequent comparison and/or presentation via the user interface 103. To this end, note that the user interface may receive the extracted content from the data store 101 or directly from the document processing module 105.

In some embodiments, the document processing module 105 is configured to extract all of the text within the document and reproduce that text in the document review panel. In some cases, the document processing module 105 (or the user interface 103) is further configured to add expandable and collapsible sections to the extracted content document. As is known, a collapsible section temporarily collapses a given content section under a header or title of that section so as to effectively hide that section, and can be expanded again to reveal the hidden content. The collapsing/hiding action typically takes place in response to a UI control element (such as a minus sign next to the section header or the header title itself) being selected. Likewise, an expanding/reveal action typically takes place in response to a UI control element (such as a plus sign next to the section header or the header title itself) being selected. One example of expand/collapse functionality is shown in FIGS. 5b-d, which will be discussed in turn.

The conditions module 109 is programmed or otherwise configured to access or otherwise receive the information extracted from the incoming digital document by the document processing module 105 and to compare that information with pre-established auto-sign conditions set by the signer. To this end, the conditions module 109 may be further configured to operate in conjunction with the user interface 103 as indicated in FIG. 5b. In more detail, when the user indicates a desire to specify conditions for auto-sign (via the main page shown in FIG. 5a) for a given document, the conditions page shown in FIG. 5b is presented to the user via the user interface 103. In this example case, the user has selected a target document (DigitalDoc_11-1-2013.pdf), which happens to be an agreement that includes five main articles (Article I through V).

The conditions page of the example embodiment shown in FIG. 5b is provided by the user interface 103 and includes a pull-down menu associated with each article of the agreement, so as to allow the user to indicate approval of that article or any conditions associated with that article. If a section or so-called article in this example case is approved, then the only subsequent processing would entail ensuring that no changes to that article are made (e.g., as determined by the document process module 105). On the other hand, if an article is indicated as conditional by the user, then a text box is provided to the user so as to allow a description of the condition to be entered. The user may describe the condition using one or two terms that are readily searchable in a proposed document, or a brief description to facilitate natural language processing of that condition. In any case, a proposed document can be analyzed to determine if designated conditions are met.

So, once the target document is selected, the document process module 105 extracts the content of the document and the user interface 103 presents that extracted content in the document review panel. As can be further seen in FIG. 5b, the document process module 105 or the user interface 103 (or some other module) can be configured to add expand (+) and collapse (−) UI control features to the extracted content, to further facilitate display of that content in the document review panel. This allows the user the ability to review the document to establish any initial approvals or disapprovals. Sections that are approved can be collapsed to conserve display space, while sections that are conditional or otherwise in contention can be expanded to facilitate review, if so desired.

In the example case of FIG. 5b, the user has indicated, via pull-down menus, that articles I, II, IV and V are agreed to or otherwise approved in their current form. However, the user has further indicated, via a pull-down menu, that article III is conditional. Upon selection of the conditional status, the user interface 103 is further configured to present the user with a text box for each section of that article, which in this example case includes sections A and B. The user has provided a pricing condition in the text box for section A (≥$25.00 per widget) and a term condition in the text box for section B (≥3 years). The agreement currently recites a price of $20.00 per widget and a term of one year. As can be further seen, the user can store the provided conditions to the data store 101 by selecting the Store Conditions control button, and may navigate to the main page or other pages of the application as desired using the navigation links.

Note that, although the user has provided the initial conditions via a user interface, subsequent reviews of the agreement can be carried out automatically without further user interaction using, for example, standard content extraction by the document processing module 105 as well as term searching and natural language processing by the conditions module 109 to assess whether the previously specified auto-sign conditions are met or not. In either case, the conditions module 109 can inform the auto-sign module 114 accordingly, and appropriate notifications can be sent to the user (signer) as desired. Moreover, if a previously agreed to article has been changed, which in some embodiments can be detected by the document processing module 105 the user can be so notified. For each document revision cycle going forward, the eSigning application 100 can automatically assess the status of the agreement and inform the potential signer of what is happening by way of, for example, email or text messages, or an automated voicemail message, or some other suitable form of outgoing message that can be sent via the notifications module 107 in accordance with an embodiment, as will be discussed in turn.

With further reference to FIG. 1a, the notifications module 107 is programmed or otherwise configured to receive information indicative of events that may be relevant to the auto-signing process. For instance, in this particular example embodiment, the notifications module 107 is configured to receive external notifications (e.g., approval communications such as emails or voicemails) as well as status changes from the document processing module 105 that are indicative of internal events (e.g., document is now signed by other party and no other changes have been made). In addition, the notifications module 107 is configured to receive status or feedback from the auto-sign module 114 (e.g., document has been auto-signed or document has been modified but still does not meet set criteria). The notifications module 107 may forward or otherwise use such feedback to generate outgoing messages to keep the signer informed regarding the status of the document. In addition, the notifications module 107 is configured to pass event data of interest to the events module 111 for analysis. The event data of interest can be determined based on any pre-established events specified by the signer via the events module 111 which is programmed or otherwise configured to assess event data provided by the notifications module 107.

To this end, the notifications module 107 and the events module 111 may be further configured to operate in conjunction with the user interface 103 as indicated in FIG. 5c. In more detail, when the user indicates a desire to specify events for auto-sign (via the main page shown in FIG. 5a) for a given document, the events page shown in FIG. 5c is presented to the user via the user interface 103. Continuing with the previous example, assume the user has selected the target document DigitalDoc_11-1-2013.pdf, which is the agreement that includes Articles I through V.

The events page of the example embodiment shown in FIG. 5c is provided by the user interface 103 and includes a number of UI control features. One such feature is a 'click to add' an internal event and another is a 'click to add' an external event. Once the user clicks either one of these features, then a pull-down menu appears that includes a number of selectable options. Each option in the pull-down list indicates an event that the eSigning application 101 is capable of detecting or otherwise acting upon. Such event options can be user-configurable and/or hard-coded, in some embodiments. For instance, in the specific example shown, a first internal event provided refers to the event of a party signing the agreement (e.g., which can be detected by the document processing module 105) and a second internal event provided refers to the event of no revisions being made (e.g., which can also be detected by the document processing module 105). Also, a first external event provided refers to the event of receiving law department approval and a second external event receiving manager approval. As can be further seen, the user can store the provided events to the data store 101 by selecting the Store Events UI control button, and may navigate to the main page or other pages of the application as desired using the navigation links.

In the specific example shown, with respect to the first external event, the selected notification method is a response from a designated email address (lawdept@company.com). In one such example case, upon receiving the user provided event information, the notifications module 107 can automatically send a copy of the agreement to the designated email address along with a request for approval (e.g., "please reply to this email and check box below if you approve this agreement" or "please click the Approved link if you approve this agreement; otherwise click the Disapprove link"). The notifications module 107 can monitor a given mailbox for the response (or receive response based on a link click) to the email so that the response can be interrogated by the events module 111 (e.g., evaluate the check box provided to the user, or the link clicked by the user, or use term search or natural language processing to parse response for approval/disapproval). With respect to the second external event, the selected notification method is a response from a designated telephone number (650-123-4567). In one such example case, subsequent to receiving the user provided event information, the notifications module 107 can send an advance copy of the agreement and sometime thereafter automatically call the telephone number for approval (e.g., "please press 1 if you approve the agreement previously forwarded to your email; otherwise, please press 2 if you disapprove"). The notifications module 107 can receive the response based on the user selection to the voice call and provide that event data to the events module 111 for analysis. Numerous other such external events based on bi-directional communication scenarios will be apparent in light of this disclosure.

Note that, although the user has provided the events, subsequent reviews of the agreement can be carried out automatically without further user interaction using, for example, standard content extraction by the document processing module 105 as well as event analysis by the notifications module 109 and/or the events module 111 to assess whether the previously specified auto-sign events have occurred or not, as previously explained. In either case, the events module 111 can inform the auto-sign module 114 accordingly, and appropriate notifications can be sent to the user (signer) via notifications module 107 if desired. This automatic event analysis can be repeated for each document revision cycle with little or no involvement by the signer.

With further reference to FIG. 1a, the auto-sign module 114 is programmed or otherwise configured to receive approval data (or disapproval data, as the case may be) from each of the conditions module 109 and the events module 111 and to auto-execute the target document with the signer's signature when appropriate. In one such embodiment, if the auto-sign module 114 receives an approval signal from each of the conditions module 109 and events module 111 then the auto-sign module 114 is configured to retrieve the signer's digital signature from the data store 101 (or some other storage location) and to imprint that signature in the target document at the appropriate signature line. To this end, the auto-sign module 114 may be further configured to identify the signature line, by searching for the signer's name and a line proximate thereto. Once the line location is identified, the signature can be applied to that line. A date may be added in a similar manner. In one such embodiment, the auto-sign module 114 may be further configured to identify the date line, by searching for the word 'Date' and a line proximate thereto. Once the date location is identified, the current date can be applied to that line. Any number of other such suitable auto-execute procedures will be apparent in light of this disclosure.

On the other hand, and in accordance with an embodiment, if the auto-sign module 114 receives a disapproval signal from one or both of the conditions module 109 and events module 111 then the auto-sign module 114 is configured to provide feedback data to the notifications module 107. For example, the feedback data may include an indication that the auto-signature could not be applied and the related reasons (e.g., failed price condition and/or failed external event #2). In one example embodiment, the feedback may include an audit report that includes the current status of the target document along with other pertinent data that may be of interest to the signer (or other person). The audit report may be generated, for example, by the user interface 103 and may include information such as that shown in FIG. 5d, in accordance with one embodiment.

Figure 1B:
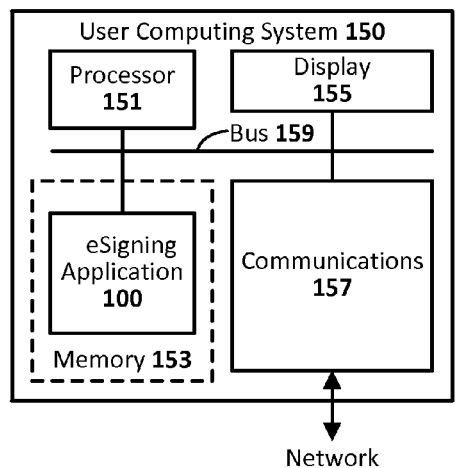
FIG. 1b illustrates a computing system configured with the eSigning application of FIG. 1a, in accordance with an embodiment of the present invention.

FIG. 1b illustrates a computing system 150 configured with the eSigning application 100, in accordance with an embodiment of the present invention. The computing system 150 can be, for example, a desktop, laptop, workstation, tablet, smartphone, or any other suitable computing system. As can be seen, the computing system 150 includes a processor 151, a memory 153 a display 155 a communications module 157 (for facilitation of wired and/or wireless communication to and from the computing system 150), and a bus structure 159 to allow for any needed connectivity and inter-component communications. Each of these components can be implemented using conventional technology, as will be appreciated. As can further be seen, the eSigning application 100 is non-transiently stored in the memory 153 and is executable by the processor 151. Thus, the computing system can provide auto-signature functionality as variously provided herein.

Figure 1C:
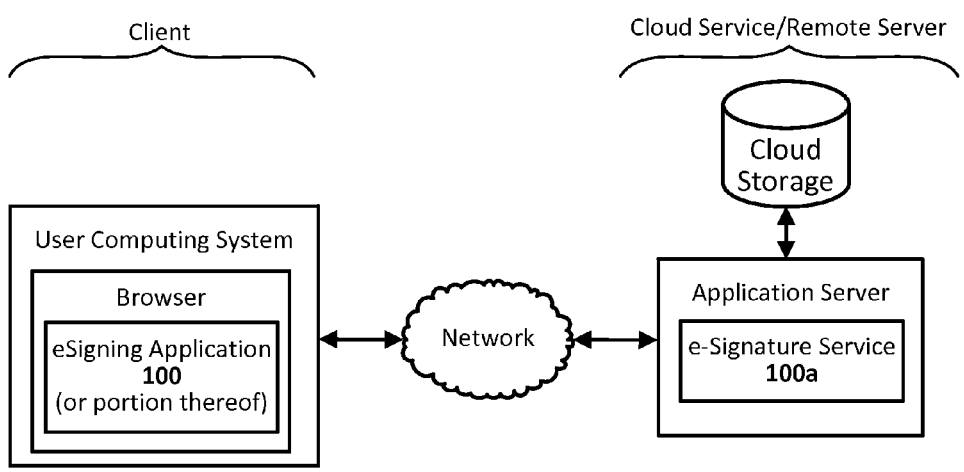
FIG. 1c illustrates an online service configured with the eSigning application of FIG. 1a, in accordance with another embodiment of the present invention.

FIG. 1c illustrates an online service configured with the eSigning application of FIG. 1a, in accordance with another embodiment of the present invention. As can be seen, the overall depicted system includes a dynamic web application (e-Signature Service 100a) executable on an application server and programmed or otherwise configured to interact with a client that is communicatively coupled to the application server via a network. The application server further has access to a database or so-called cloud storage. The client includes a user computing system having a browser application that can be used to access the e-Signature service 100a via the network. This client-server arrangement can be implemented using any number of known technologies, so as to provide various remote users access to the service 100a via the network.

The service 100a effectively provides users with a remote version of eSigning application 100. In operation, when a user requests access to the service 100a, some of the eSigning application 100 functionality as described herein may be executed on the server while other portions of the eSigning application 100 functionality can be executed on the client computing system. For instance, the data store 101 can be implemented in the cloud storage, and each of the document processing module 105 notifications module 107 conditions module 109 events module 111 and auto-sign module 114 can be executed by the server. On the other hand, the user interface 103 can be served to the client computing system (as JavaScript or other suitable code) and executed in the browser application to provide the user access to the server side functionality (e.g., via HTML Posts and Gets and/or other suitable operations typical of a client server arrangement).

The network can be any communications network, such as a user's local area network and/or the Internet, or any other public and/or private communication network (e.g., local and/or wide area network of a company, etc). The user's computing system (client) can be implemented with any suitable computing device, such as a laptop, desktop, tablet, smartphone, or other suitable computing device capable of accessing a server computer via a network and displaying content to a user, such as the example one shown in FIG. 1b. The browser application can be implemented using any number of known or proprietary browsers or comparable technology that facilitates retrieving, presenting, and traversing information resources on a network, such as the Internet, and which allows for the execution of page-embedded code such as the user interface module 103. The cloud storage can be, for example, a Java content repository (JCR) or any other suitable storage facility accessible to the server. Numerous other client-server architectures will be apparent in light of this disclosure.

Auditability

FIG. 5d illustrates an example screen shot of an audit page provided via user interface 103 in accordance with one example embodiment. As previously explained, this UI page can be presented to the user in response to the user requesting an audit of the target document (e.g., via an appropriately placed click or other selection on the 'Yes' UI control button of the user interface main page shown in FIG. 5a). The information on this audit page can also be compiled into an audit report that can be communicated to the signer or signers, as will be appreciated.

As can be seen, the user can select a target document for which to retrieve audit information. If the user has clicked over to this audit page from the main page of the user interface, then the target document currently selected at the main page can be the assumed document for audit data retrieval when the user interface 103 switches over to the audit page. As can be further seen, the audit data includes the document title, the effective date of the document (once executed), the current revision of the document along with the date that revision was sent for review and a general status of the document. In this example case shown in FIG. 5d, the first revision of the document (revision 1) was sent on Nov. 1, 2013 and partial agreement was reached. The second revision (revision 2) was sent on Nov. 2, 2013 and full agreement was reached.

The audit data further includes the requisite events for auto-signature, which in this example case include two events: law department approval and manager approval. As can be seen, receipt of each approval is confirmed, and the auditor can click the given links to view the approval email received from the law department and to hear the approval voicemail, if so desired. In some cases, the approval voicemail may be a tone (e.g., press 1 to approve), while in other cases that approval may be a spoken approval (e.g., 'approved, T. Smith'). The dates the respective approvals were received can also be provided, as well as other pertinent information, as will be appreciated.

The audit data further includes information about the parties associated with the target document, which in this example case is an agreement. Party 1 is the document originator (A. Smith) and represents ABC Co. She is the director of R&D and manually signed the agreement on Nov. 1, 2013. Party 2 (Z. Doe) represents MakeIT Corp. He is the plant manager and auto-signed the agreement on Nov. 2, 2013, by way of eSigning application 100, after having specified various events and conditions.

The audit data of this example embodiment further includes the five article titles and the respective statuses. As can be seen, article I, II, IV, and V were agreed to by Party 2 after initial review by Party 2. The date agreement was reached for each article (in this case, November 1) is provided next to the status, along with a link to revision 1 of the agreement. At that time, Party 2 further designated some conditions and events for auto-signing to occur. As can be further seen, some time thereafter article III was revised by Party 1 (e.g., perhaps in response to a request from Party 2, after his initial review of the agreement). Party 1 then provided version 2 of the agreement on the next day (November 2). The eSigning application 100 received the revised agreement (e.g., by way of an e-Signature service to which the parties subscribed or otherwise have access to) and processed the agreement as provided herein and determined that each of the events and conditions designated by Party 2 was satisfied. At this point, the status associated with article III is updated to 'Agreed' and the date agreement was reached (in this case, November 2) is provided along with a link to revision 2 of the agreement. The eSigning application 100 then operated to auto-sign the agreement on behalf of Party 2, and forwarded a copy of the fully executed agreement along with an audit report (a report that includes, for instance, information similar to that shown on the audit page of FIG. 5d) to each of Party 1 and 2.

Further note that the audit page provisioned by the user interface 103 may further allow the user to run a difference file on the current and previous versions, by way of click the UI control button or other suitable user interface mechanism for generating a difference file. In one embodiment, the difference file may be focused only on the revised sections or articles as the case may be, as shown in the example screen shot of FIG. 5d. As can be further seen, the changes to price and term are clearly reflected and explain the auto-sign conditions were satisfied. Further note that the difference file can be saved to the data store 101 or some other desired storage location.

Numerous audit schemes will be appreciated in light of this disclosure and may depend on compliance with statutory framework, established corporate practices, and/or other factors, and can therefore vary from one case to another. To this end, the claimed invention is not intended to be limited to any particular scheme. The examples expressed herein are provided to facilitate understanding and are not intended to be exhaustive.

Methodologies

Figure 2:
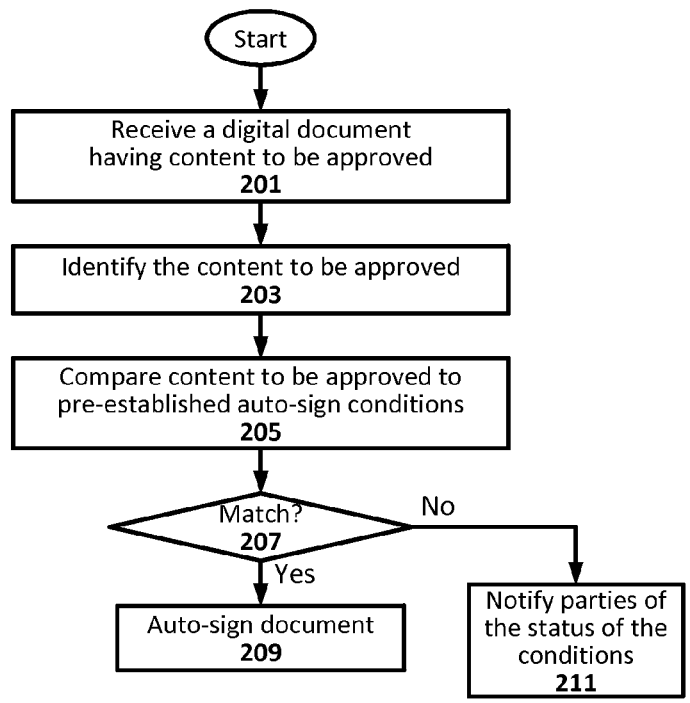
FIG. 2 illustrates a computer implemented methodology for auto-signing a digital document in response to one or more conditions being satisfied, in accordance with an embodiment of the present invention.

FIG. 2 illustrates a computer implemented methodology for auto-signing a digital document in response to one or more conditions being satisfied, in accordance with an embodiment of the present invention. This methodology, as well as the methodologies depicted in FIGS. 3 and 4, may be embodied, for example in an eSigning application or service, and may be implemented in any suitable combination of hardware, software, and firmware. The method includes receiving 201 a digital document having content to be approved (e.g., such as an agreement or paper for publication). The method continues with identifying 203 the content to be approved. This can be carried out, for instance, as previously discussed with reference to the document processing module 105 which in one embodiment operates to establish a baseline of information within the document, and to identify information within the document that has changed since the last version of the document was received. Once the content to be approved is identified, the method continues with comparing 205 that content to be approved to pre-established auto-sign conditions, and determining 207 if there is a sufficient match so as to allow for auto-signing of the document. This can be carried out, for instance, as previously discussed with reference to the conditions module 109 as will be appreciated in light of this disclosure. If there is a sufficient match so as to allow for auto-signing, then the method continues with auto-signing 209 the document (e.g., via the auto-sign module 114). On the other hand, if there is not a sufficient match at 207, then the method continues with notifying 211 the parties of the status of the conditions (e.g., via the notification module 107).

Figure 3:
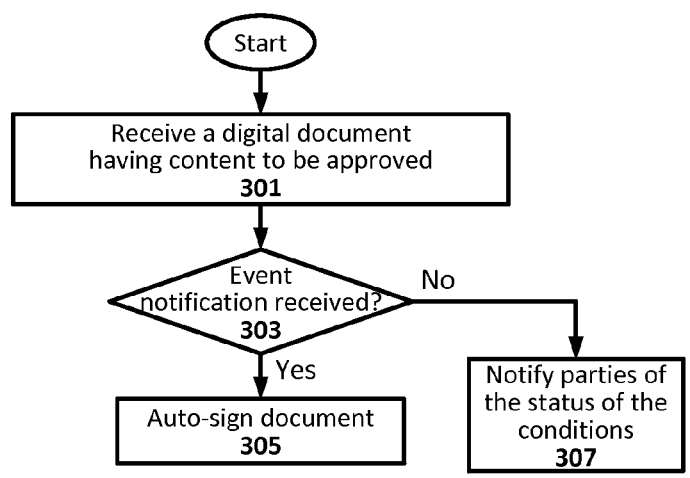
FIG. 3 illustrates a computer implemented methodology for auto-signing a digital document in response to one or more events occurring, in accordance with another embodiment of the present invention.

FIG. 3 illustrates a computer implemented methodology for auto-signing a digital document in response to one or more events occurring, in accordance with another embodiment of the present invention. The method includes receiving 301 a digital document having content to be approved (e.g., such as an agreement or paper for publication). The method continues with determining 303 if an event notification has been received. This can be carried out, for instance, as previously discussed with reference to the notifications module 107 and/or the events module 111 as will be appreciated in light of this disclosure. If there is an affirmative event notification that satisfies a user given event criteria, then the method continues with auto-signing 305 the document (e.g., via the auto-sign module 114). On the other hand, there is no affirmative event notification at 303, then the method continues with notifying 307 the parties of the status of the conditions (e.g., via the notification module 107).

Figure 4:
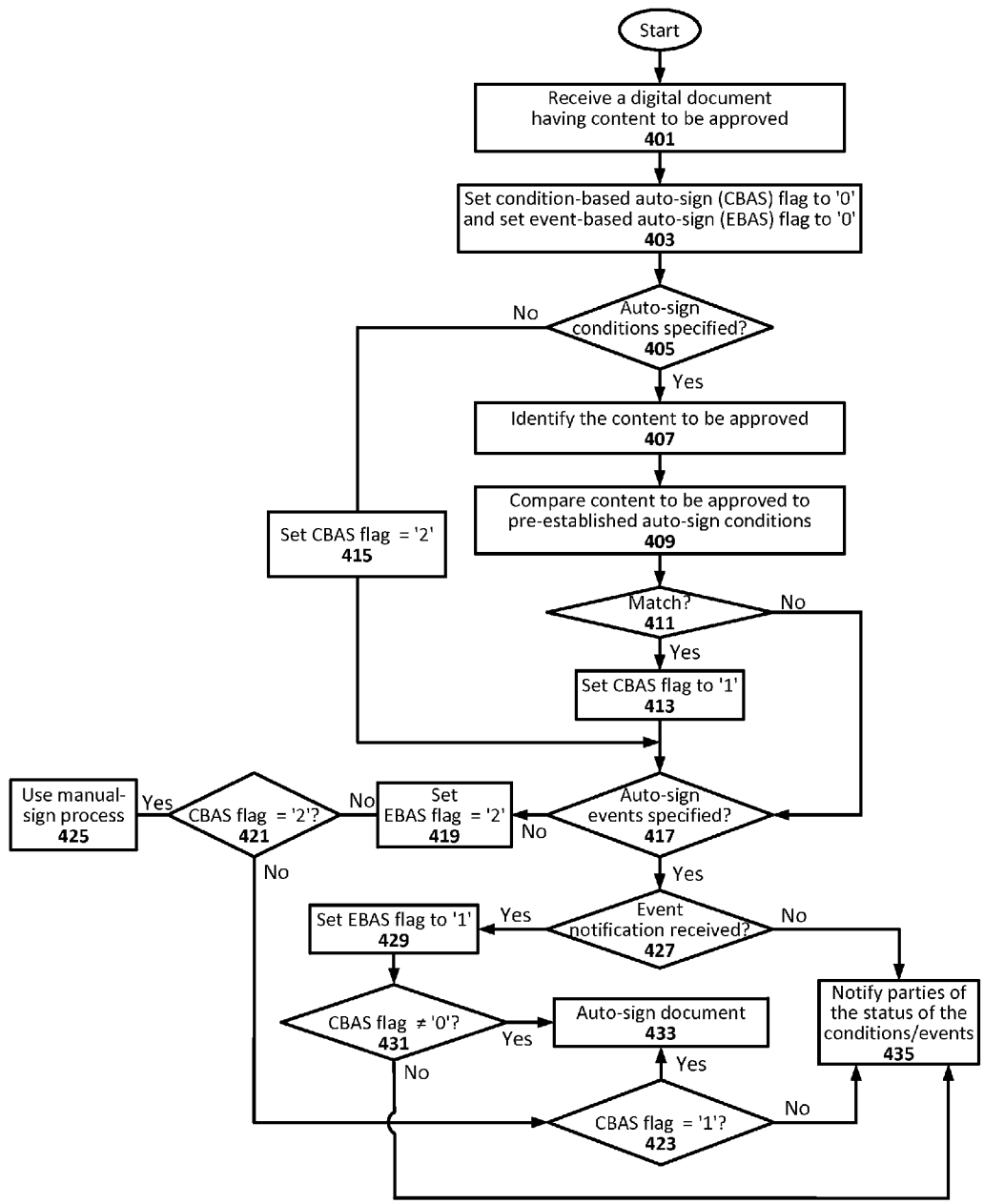
FIG. 4 illustrates a computer implemented methodology for auto-signing a digital document in response to one or more conditions being satisfied and/or one or more events occurring, in accordance with another embodiment of the present invention.

FIG. 4 illustrates a computer implemented methodology for auto-signing a digital document in response to one or more conditions being satisfied and/or one or more events occurring, in accordance with another embodiment of the present invention. The method includes receiving 401 a digital document having content to be approved (e.g., such as an agreement or paper for publication). The method continues with setting 403 a condition-based auto-sign (CBAS) flag to '0' and an event-based auto-sign (EBAS) flag to '0' for purposes initialization. The method continues with determining 405 if auto-sign conditions are specified. If not, then the method continues with setting 415 the CBAS flag to 2, and the method flow skips to 417 which will be discussed in turn. If, however, auto-sign conditions are specified, then the method continues with identifying 407 the content to be approved, and comparing 409 the content to be approved to the pre-established auto-sign conditions. The method then continues with determining 411 if the content to be approved matches or is otherwise satisfies the pre-established auto-sign conditions. If so, then the method continues with setting 413 the CBAS flag to 1. If, on the other hand, the content to be approved does not match or otherwise satisfy the pre-established auto-sign conditions, then the method flow skips to 417 which addresses event-based aspects of the methodology.

So, at 417, the method continues with determining if auto-sign events are specified. If not, then the method continues with setting 419 the EBAS flag to 2. At this point, if the CBAS flag is not set to 2 as determined at 421, then the method continues with determining 423 if the CBAS flag is set to 1. If so, then the method continues with auto-signing 433 the document. If, on the other hand, the CBAS flag is not set to 1, then the method continues with notifying 435 the appropriate parties having an interest in the execution of the document of the status of the conditions/events. The notification might include, for example, a message indicating the condition(s) that have not yet been satisfied. However, if the CBAS flag is set to 2 as well, then the auto-sign feature is not configured or is otherwise unavailable and the method may continue at 425 with a manual-sign process. If, on the other hand, auto-sign events are specified as determined at 417, then the method continues with determining 427 if a corresponding event notification has been received. If not, then the method may continue with notifying 435 the appropriate parties having an interest in the execution of the document of the status of the conditions/events. The notification might include, for example, a message indicating the event(s) and/or condition(s) that have not yet been satisfied. On the other hand, if a corresponding event notification has been received as indicated at 427, then the method continues with setting 429 the EBAS flag to 1. At this point, the method continues with determining 431 if the CBAS flag is set to a non-zero (meaning that there are either no conditions specified, or if there are conditions specified then they have been met). If not (meaning a specified condition has not been met), then the method may continue with notifying 435 the appropriate parties having an interest in the execution of the document of the status of the conditions/events. In one such example case, the notification might include a message indicating the condition(s) that have not yet been satisfied. On the other hand, if the CBAS flag is set to a non-zero, then the method continues with auto-signing 433 the document. Table 1 summarizes the methodology.

| Auto-Sign Criteria | | Flag Status | | |
| --- | --- | --- | --- | --- |
| Condition | Event | CBAS | EBAS | Action |
| 0 | 0 | 2 | 2 | Manual-sign process (auto-sign not configured) |
| 0 | 1 | 2 | 0 | Notify parties of unsatisfied event |
| 0 | 1 | 2 | 1 | Auto-sign document (events satisfied) |
| 1 | 0 | 0 | 2 | Notify parties of unsatisfied conditions |
| 1 | 0 | 1 | 2 | Auto-sign document (conditions satisfied) |
| 1 | 1 | 0 | 0 | Notify parties of unsatisfied conditions + events |
| 1 | 1 | 1 | 0 | Notify parties of unsatisfied events |
| 1 | 1 | 0 | 1 | Notify parties of unsatisfied conditions |
| 1 | 1 | 1 | 1 | Auto-sign document (conditions + events satisfied) |

As will be appreciated, other actions may be taken as well, and the scenarios captured in Table 1 are not intended to be exhaustive or otherwise limiting. For instance, parties to the document may also be notified when the document is auto-signed. In one such example case, a copy of an audit report is forwarded to each of the parties along with a fully-executed copy of the document. Numerous variations on the depicted methodology and other embodiments will be apparent in light of this disclosure.

Numerous embodiments will be apparent, and features described herein can be combined in any number of configurations. One example embodiment of the present invention provides a computer implemented methodology. The method includes determining, by a computing system, if a condition, event or combination thereof associated with a digital document is satisfied, wherein the digital document has content to be approved by a signer. The method further includes auto-signing, by the computing system, the digital document on behalf of the signer in response to the condition, event or combination thereof being satisfied, wherein the content to be approved is deemed acceptable in light of the condition, event or combination thereof being satisfied. The computing system may be, for example, a mobile computing device (e.g., smart phone, laptop, tablet, a server (e.g., cloud-based computing architecture), or a combination thereof. In some cases, the method includes receiving the digital document at an online e-signature service accessible via a network, and identifying the content to be approved. In some cases, the condition, event or combination thereof includes a pre-established condition, and the method further includes comparing the content to be approved to the pre-established condition, and determining if there is a sufficient match based on the comparing so as to allow for auto-signing of the digital document. In some such example cases, if there is not a sufficient match, then the method further includes issuing a notification regarding status of the digital document with respect the pre-established condition. In some cases, the condition, event or combination thereof includes a pre-established event, and the method further includes determining if an event notification related to the pre-established event has been received so as to allow for auto-signing of the digital document. In some such cases, if an event notification related to the pre-established event has not been received, then the method further includes issuing a notification regarding status of the digital document with respect the pre-established event. In some cases, the method includes issuing a notification reporting status of the digital document. In some such cases, the status indicates that the digital document has been auto-signed. In other such cases, the status indicates that the digital document has been not been auto-signed due to an unmet condition and/or event included in the condition, event or combination thereof. In some cases, the method includes issuing an audit report associated with the digital document.

Another embodiment of the present invention provides a non-transient computer program product encoded with instructions that when executed by one or more processor cause a method to be carried out. In one such example case, the method includes determining if a condition, event or combination thereof associated with a digital document is satisfied, wherein the digital document has content to be approved by a signer. The method further includes auto-signing the digital document on behalf of the signer in response to the condition, event or combination thereof being satisfied, wherein the content to be approved is deemed acceptable in light of the condition, event or combination thereof being satisfied. In some cases, the method further includes receiving the digital document, and identifying the content to be approved. In some cases, the condition, event or combination thereof includes a pre-established condition, and the method further includes comparing the content to be approved to the pre-established condition, and determining if there is a sufficient match based on the comparing so as to allow for auto-signing of the digital document. In some example cases, the condition, event or combination thereof includes a pre-established event, and the method further includes determining if an event notification related to the pre-established event has been received so as to allow for auto-signing of the digital document. In some example cases, the method includes issuing a notification reporting status of the digital document. In one such case, the status indicates that the digital document has been auto-signed or that the digital document has been not been auto-signed due to an unmet condition and/or event included in the condition, event or combination thereof. In some example cases, the method includes issuing an audit report associated with the digital document.

Another embodiment of the present invention provides a computing system. In this example case, the system includes one or more processors and an e-signature application executable by the one or more processors and configured to: determine if a condition, event or combination thereof associated with a digital document is satisfied, wherein the digital document has content to be approved by a signer; and auto-sign the digital document on behalf of the signer in response to the condition, event or combination thereof being satisfied, wherein the content to be approved is deemed acceptable in light of the condition, event or combination thereof being satisfied. In one such example case, the e-signature application is further configured to issue a notification reporting status of the digital document, wherein the status indicates one or more of the following: that the digital document has been auto-signed; that the digital document has been not been auto-signed due to an unmet condition and/or event included in the condition, event or combination thereof; and auditing data associated with the digital document.

The foregoing description of example embodiments has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. An electronic signature method implemented at an electronic signature application server device, the method comprising:

receiving, by the electronic signature application server device, from a document sender, a document containing a fixed document term and a variable document term, wherein the document sender has indicated that a document recipient is not allowed to modify the fixed document term, while the variable document term is associated with a parameter that can be set by the document recipient;

receiving, by the electronic signature application server device, from the document sender, a condition on the variable document term, wherein satisfaction of the condition depends on the parameter set by the document recipient;

defining, by the electronic signature application server device, a recipient's signature block at a first location in the document that is configured to receive a signature of the document recipient;
defining, by the electronic signature application server device, an automatic signature block at a second location in the document that is configured to receive an automatically generated electronic signature authorized by the document sender;
sending the document from the electronic signature application server device to the document recipient;
receiving, by the electronic signature application server device, from the document recipient, the document, wherein the document received from the document recipient includes the signature of the document recipient positioned in the recipient's signature block;
making a first determination, by the electronic signature application server device, and after the document is received from the document recipient, that the fixed document term has not been modified from its state when the document was sent to the document recipient;
making a second determination, by the electronic signature application server device, and after the document is received from the document recipient, that the parameter set by the document recipient satisfies the condition;
in response to making the first and second determinations, applying, by the electronic signature application server device, the automatically generated electronic signature to the automatic signature block without user intervention; and
transmitting the document that includes both the signature of the document recipient and the automatically generated electronic signature authorized by the document sender, from the electronic signature application server device to the document sender.

2. The method of claim 1, further comprising locating, by the electronic signature application server device, the variable document term in the document received from the document sender.

3. The method of claim 1, wherein satisfaction of the condition further depends on occurrence of a specified event.

4. The method of claim 1, further comprising sending a notification reporting a document status from the electronic signature application server device to at least one of the document sender and the document recipient.

5. The method of claim 1, further comprising sending, from the electronic signature application server device to at least one of the document sender and the document recipient, a notification indicating that the automatically generated electronic signature was applied to the automatic signature block.

6. The method of claim 1, further comprising recording, in an audit record administered by the electronic signature application server device, an audit entry indicating that the automatically generated electronic signature was applied to the automatic signature block.

7. The method of claim 1, wherein the electronic signature application server device is selected from a group consisting of a mobile computing device and a desktop computer.

8. An electronic signature application server device that comprises a memory device and a processor that is operatively coupled to the memory device, wherein the processor is configured to execute instructions stored in the memory device that, when executed, cause the processor to carry out an electronic signature process that comprises:

receiving, by the electronic signature application server device, from a document sender, a document containing a fixed document term and a variable document term, wherein the document sender has indicated that a document recipient is not allowed to modify the fixed document term, while the variable document term is associated with a parameter that can be set by the document recipient;
receiving, by the electronic signature application server device, from the document sender, a condition on the variable document term, wherein satisfaction of the condition depends on the parameter set by the document recipient;
defining, by the electronic signature application server device, a recipient's signature block at a first location in the document that is configured to receive a signature of the document recipient;
defining, by the electronic signature application server device, an automatic signature block at a second location in the document that is configured to receive an automatically generated electronic signature authorized by the document sender;
sending the document from the electronic signature application server device to the document recipient;
receiving, by the electronic signature application server device, from the document recipient, the document, wherein the document received from the document recipient includes the signature of the document recipient positioned in the recipient's signature block;
making, by the electronic signature application server device, after the document is received from the document recipient, at least one of (a) a first determination that the fixed document term has been modified from its state when the document was sent to the document recipient, and (b) a second determination that the parameter set by the document recipient does not satisfy the condition; and
in response to making at least one of the first and second determinations, sending a notification from the electronic signature application server device to the document sender that the document is at least partially unsigned.

9. The electronic signature system of claim 8, wherein the notification is also sent from the electronic signature application server device to the document recipient.

10. The electronic signature system of claim 8, wherein:
satisfaction of the condition further depends on occurrence of a specified event; and
the electronic signature process further comprises making, by the electronic signature application server device, at least one of the first determination, the second determination, and a third determination that the specified event has not occurred.

11. The electronic signature system of claim 8, wherein the electronic signature process further comprises generating, in an audit record administered by the electronic signature application server device, an audit entry indicating that at least one of (a) the fixed document term has been modified, and (b) the condition is unsatisfied.

12. The electronic signature system of claim 8, wherein the electronic signature process further comprises recording, in an audit record administered by the electronic signature application server device, an audit entry indicating that the document is at least partially unsigned.

13. A non-transitory computer readable medium encoded with instructions that, when executed by one or more processors, cause an electronic signature process to be carried out, the electronic signature process comprising:

receiving, by the electronic signature application server device, from a document sender, a document containing a fixed document term and a variable document term, wherein the document sender has indicated that the document recipient is not allowed to modify the fixed document term, while the variable document term is associated with a parameter that can be set by the document recipient;

receiving, by the electronic signature application server device, from the document sender, a condition on the variable document term, wherein satisfaction of the condition depends on the parameter set by the document recipient;

defining, by the electronic signature application server device, a recipient's signature block at a first location in the document that is configured to receive a signature of the document recipient;

defining, by the electronic signature application server device, an automatic signature block at a second location in the document that is configured to receive an automatically generated electronic signature authorized by the document sender;

sending the document from the electronic signature application server device to the document recipient;

receiving, by the electronic signature application server device, from the document recipient, the document, wherein the document received from the document recipient includes the signature of the document recipient positioned in the recipient's signature block;

making a first determination, by the electronic signature application server device, and after the document is received from the document recipient, that the fixed document term has not been modified from its state when the document was sent to the document recipient;

making a second determination, by the electronic signature application server device, and after the document is received from the document recipient, that the parameter set by the variable document recipient satisfies the condition;

in response to making the first and second determinations, applying, by the electronic signature application server device, the automatically generated electronic signature to the automatic signature block without user intervention; and transmitting the document that includes both the signature of the document recipient and the automatically generated electronic signature authorized by the document sender, from the electronic signature application server device to the document sender.

14. The non-transitory computer readable medium of claim 13, wherein the electronic signature process further comprises locating, by the electronic signature application server device, the variable document term in the document received from the document sender.

15. The non-transitory computer readable medium of claim 13, wherein the document received from the document recipient further includes the parameter set by the document recipient.

16. The non-transitory computer readable medium of claim 13, wherein:

satisfaction of the condition further depends on occurrence of a specified event;

the electronic signature process further comprises making a third determination, by the electronic signature application server device, that the specified event has occurred; and the electronic signature application server device applies the automatically generated electronic signature to the automatic signature block without user invention in response to making the first, second, and third determinations.

17. The non-transitory computer readable medium of claim 13, wherein the electronic signature process further comprises sending a notification reporting a document status from the electronic signature application server device to at least one of the document sender and the document recipient.

18. The non-transitory computer readable medium of claim 13, wherein the electronic signature process further comprises sending, from the electronic signature application server device to at least one of the document sender and the document recipient, a notification indicating that the automatically generated electronic signature was applied to the automatic signature block.

19. The non-transitory computer readable medium of claim 13, wherein the electronic signature process further comprises recording, in an audit record administered by the electronic signature application server device, an audit entry indicating that the automatically generated electronic signature was applied to the automatic signature block.

20. The non-transitory computer readable medium of claim 13, wherein:

the signature of the document recipient is a graphical representation of a handwritten signature of the document recipient; and the automatically generated electronic signature is a graphical representation of a handwritten signature of the document sender.

* * * * *

UNITED STATES PATENT AND TRADEMARK OFFICE
CERTIFICATE OF CORRECTION

PATENT NO. : 9,544,149 B2  
APPLICATION NO. : 14/107967  
DATED : January 10, 2017  
INVENTOR(S) : Benjamin D. Follis Page 1 of 1

It is certified that error appears in the above-identified patent and that said Letters Patent is hereby corrected as shown below:

In the Claims

Column 21, Line 40, Claim 13, please replace "variable document" with --document--.

Signed and Sealed this  
Eleventh Day of April, 2017

Michelle K. Lee  
*Director of the United States Patent and Trademark Office*